March 5, 1968      J. F. MOULIN      3,371,527
METHOD FOR IDENTIFYING WELL FLUIDS
Original Filed Oct. 14, 1963
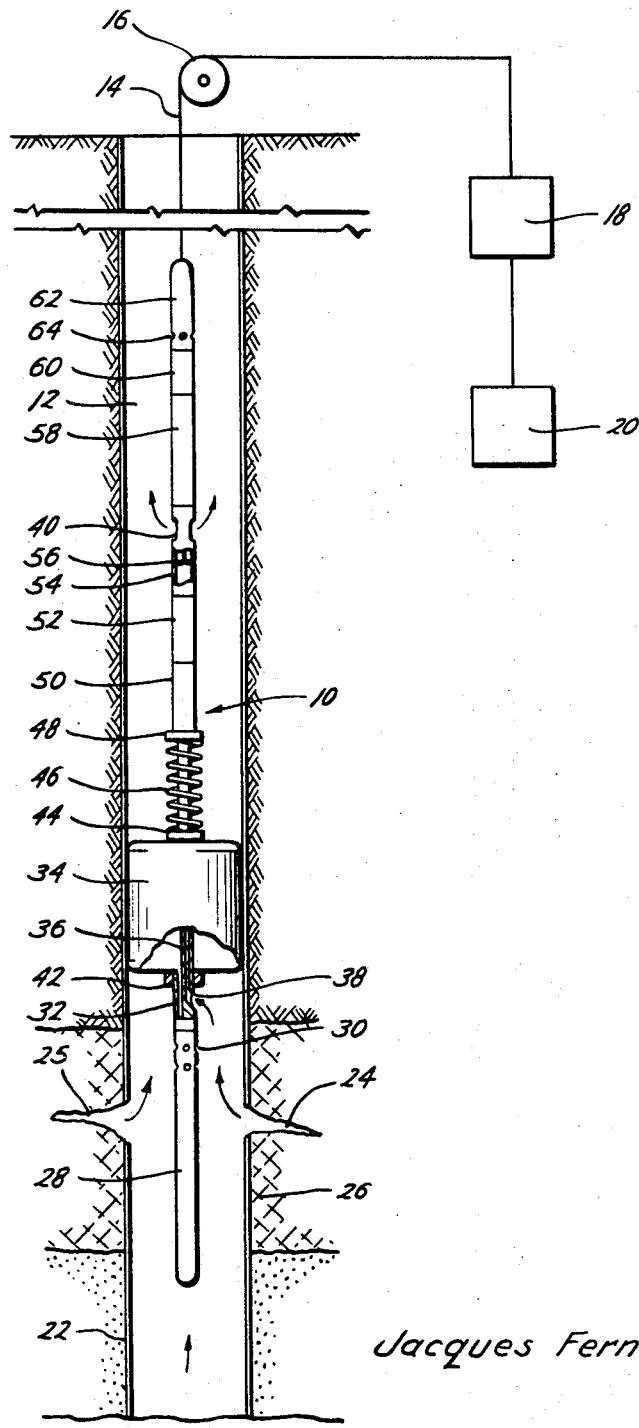
Jacques Fernand Moulin
INVENTOR.
BY Ronald H. Fidler
ATTORNEY

United States Patent Office 3,371,527
Patented Mar. 5, 1968

3,371,527
METHOD FOR IDENTIFYING WELL FLUIDS
Jacques Fernand Moulin, 72 Rue Lauriston,
Paris, France
Continuation of application Ser. No. 315,802, Oct. 14,
1963. This application Dec. 29, 1966, Ser. No. 605,938
Claims priority, application France, Oct. 23, 1962,
913,059
1 Claim. (Cl. 73—155)

ABSTRACT OF THE DISCLOSURE

The particular embodiment described herein as illustrative of one form of a method and apparatus for performing production logging operations in a well includes in situ measuring the percent of water, the density, and the rate of flow of the mixed producing fluids in the well. Simultaneous indications at the surface of these parameters are used to determine the specific relationship of each phase of the fluids in the mixture as it is produced.

---

This application is a continuation of Ser. No. 315,802, filed Oct. 14, 1963, and now abandoned.

This invention relates to a method and apparatus for analyzing fluids produced in wells and, more particularly, it relates to a method and an apparatus for qualitatively and quantitatively analyzing the fluid flowing at different levels of a producing oil well.

It is a well-known fact that fluid produced from oil wells is a mixture containing in extremely variable proportions, oil, gas, and salt water.

A particular object of the invention relates to methods and apparatus which define for each level selected, the partial outputs of oil, gas and water from a fluid mixture so that the actual partial outputs of each producing formation, or else, the exchange of fluid between various levels or formations can be determined.

One of the requirements for apparatus used to measure gas, oil and water proportions of a mixture of fluids is that the apparatus should not affect the balance of the ingredients in the mixture so that true proportion measurements can be obtained.

It is, on the other hand, essential for the devices that measure the different partial outputs of a mixture of fluid flow to be arranged in a manner such that each may execute its own measurement on the same mixture of fluids.

Heretofore, it has been proposed to use a flowmeter in combination with a density measuring device such as a radioactivity device where the flow is directed through both the flowmeter and density measuring device. However, measuring density of the fluid mixture of gas, oil and water does not give the actual proportions of gas, oil and water in the mixture.

Flowmeters which use packers heretofore have had the flow access openings at considerable distances below the packer element. This is disadvantageous in that after the packer element is inflated, fluids are statically collected between the inflated packer element and access openings. This static collection of fluids is unstable in that the components of the fluid mixture separate out (due to different specific weights) and ultimately collect sufficiently to provide a discharge to the access opening with a resultant disproportionate mixture flow through the tool. For example, in the presence of a flowing mixture containing a large proportion of water, a water flow is passed through the tool and the first measurements made do not have any relationship with the actual water proportion of output of the well. On the other hand, if gas is contained in substantial proportions in the fluid mixture, the gas collects between the packer element and the access openings of the tool. Eventually, a gas bubble is formed and when the gas bubble reaches the access openings of the tool, the gas discharges through the tool and the pressure of the fluid column is reduced. This phenomenon appears with a frequency and an amplitude depending in particular on the composition of the mixture and on the distance separating the access opening of the tool and the packer element. It is, of course, essential to eliminate, or at least to reduce substantially, this phenomenon, so that the measurements obtained, may be in direct relationship with the actual output of the well.

According to the invention, a method for defining the nature of the three fluids of a mixture which may be found at different levels in a well, consists in measuring and in recording simultaneously at least two magnitudes of characteristics of the fluids of which each is more specially characteristic of the nature of one of said fluids.

According to such a method, there is measured preferably in an oil well two of the three following magnitudes: density, viscosity, percentage of water in the mixture.

Through such a method, it is possible, for each measuring level, to determine from three equations and the two measurements the relative proportions of the fluids forming the mixture located at said level.

In a modification of the method according to the invention, one measures and one records at each level, on the one hand, the temperature and the pressure prevailing there and, on the other hand, the specific weight, the viscosity and the percentage of water in the mixture, after which and in order to provide the three equations describing the mixture, two informations are selected of which the values, for a given temperature and pressure, define in a more characteristic manner, the composition of the mixture.

For the application of said method, one will select for instance the information constituted by specific weight, if the latter is low, and the percentage of water as a further information, if said percentage is large, since the mixture is then constituted to a considerable proportion, by gas and water.

Of course, it is possible to resort, in order to perfect the results of calculation to the third information which has been at first, put aside.

According to a particular modification of the method according to the invention and in order to define the relative proportions of the fluids of the mixture flowing at the different levels of an oil well during production, the fluids are caused to pass into a flow measuring tube with a speed of flow ranging between 60 and 1200 centimeters per second and the measurement is then performed inside said tube for two magnitudes at least, of which each is more specially characteristic of the nature of one of the three fluids (water, gas and oil) which are liable to be found in said well.

In reducing to practice such a method, there is selected for the flow measuring tube, a diameter depending on the total output of the well (large, medium or low) and thus, measurements are executed on fluids passing through the measuring tube during substantially equal times, which allows ascertaining the relative proportions of the three fluids during their flow.

As an application of the methods according to the invention, an apparatus, defining at different levels of a well the nature of the fluids located at said level, is characterized by the fact that it is chiefly constituted by a measuring tube having an input and an output for said fluids while the measuring devices which are positioned directly inside the actual flow measuring tube are adapted to measure at least two magnitudes, each of which depends more particularly on the nature of one of the components of said fluids.

According to a particular feature of the invention, an apparatus for defining the relative positions of the fluids flowing at a predetermined level in an oil well during production, is equipped with an expandable packer element. The passage afforded by the measuring tube has an area selected in accordance with the output of the well so that the speed of flow of the fluids, may range inside said tube between 60 and 1200 centimeters per second, when he packer element is expanded.

According to a further particular feature of the invention, and in the case of an apparatus defining the partial outputs of fluids flowing at different levels in an oil well during production, the measuring tube in further more equipped with a flowmeter.

Through said arrangements, and as will be disclosed hereinafter, the information supplied by the measuring devices and the flowmeter may be associated without any particular difficulty and with the aid of such information, it is possible to write down and then to solve the equations supplying for instance the real partial outputs at the level at which the measuring has been executed.

According to a further particular feature of the invention, the lower openings in the measuring tube, are as near as possible the lower end of the packer. Through this latter arrangement, the relaxation phenomena in the flow of gases inside the tube are practically eliminated.

The features and advantages of the invention will appear furthermore in a more accurate manner from the following description, refernce being made to the accompanying drawings.

In the drawings, apparatus 10 according to the invention has been positioned in an oil well 12 by means of the usual electrical cable 14 spooled on a winch 16. Apparatus 10 is electrically connected to surface panel 18 which is coupled to a conventional multitrack recorder 20. Panel 18 receives the electrical signals from the various downhole measuring devices and converts these signals in the usual manner to voltage or current signals which operate galvanometers in the recorder 20.

The well 12 is provided with a casing 22. Two perforations 24 and 25 adapted to provide for production of the upper formation layer 26 have been provided in the casing 22.

Tool or apparatus 10 includes a pressure gauge 62, a thermometer 60, an electrical cartridge 58, a flowmeter 54, a water detecting device 52, a density measuring device and viscosity measuring device 50, an inflatable packer 34 and a hydraulic power means 28 for the packer 34.

Pressure gauge 62 may be of any known type but is preferably of the type disclosed in a pending U.S. application Ser. No. 210,952, now U.S. Patent No. 3,199,355, assigned to the assignee of the present invention. Briefly, this pressure gauge uses a vibratory cylinder which is vibrated at a resonant frequency and effect of pressure is measured by a pick-up coil. This application discloses improvements over a pressure measuring device disclosed in U.S. Patent No. 3,021,711. Access openings 64 are provided to admit fluids to the pressure sensing device.

Thermometer 60 is of any known type for remote temperature measurements.

Flowmeter 54 may be of any known type but preferably of the type in which the direction as well as the magnitude of fluid flow is determined. The flowmeter includes an impeller 56 which when rotated under the influence of fluid flow provides a characteristic signal indicative of direction and magnitude of fluid flow. To do this, a dissymmetrically magnetized armature can be coupled to the impeller shaft and coil provided in the housing to detect the rotation of the shaft.

The viscosity and density measuring devices 50 may be of the type disclosed in U.S. patent application Ser. No. 230,224 now U.S. Patent No. 3,225,588 which is assigned to the assignee of the present invention. This measuring device, which is an improvement over French Patent No. 1,145,413, measures specific weights of fluids by vibration of a hollow container and also obtains a measurement of viscosity independent of specific weights. The device while being in contact with the fluids provides a relatively unrestricted passageway therethrough. The device also measures density independent of viscosity.

The water measuring device 52 may be of the type disclosed in U.S. patent application Ser. No. 254,247 which is assigned to the assignee of the present invention. Briefly, this or any other suitable device measures the amount of water in the entire mixture of fluids. This can be done by capacitor cells or electrodes where the measurements may be calibrated to water content of mixture tested.

Below the densimeter 50 is a collar 48 to which a spring 46 is attached. The lower end of spring 46 is coupled to an upper sliding collar 44 of packer element 34 while the lower end of packer element 34 is securely attached to the tool body by a collar 42. The packer element 34 is a substantially fluid-tight bag of nylon fabric impregnated with neoprene. Spring 46, when stretched as shown in FIG. 1, is also twisted about the tool body. The packer is inflated and deflated by fluid under pressure supplied by the hydraulic device 28 via the passageway 32. When pressure is reduced within the packer element the spring 46 collapses and twists the packer element about the tool body.

The hydraulic means 28 includes a reversible pump to transmit fluid from and into the packer element, the fluid being received from the well bore via ports 30. For further details of the hydraulic means 28 and packer element reference may be made to U.S. Patent No. 3,066,739.

Immediately below the securing collar 42 of packer 34, flow access is provided and couples to a substantially uniform diameter flow passage or measuring tube 36 which maintains its uniformity at least through the sections of the tool having the density, viscosity and water measuring devices 50, 52 and preferably also through the flowmeter 54. The flow passage 36 opens to the exterior of the tool at 40 above the flowmeter section.

In operation, the packer element is expanded and fluids from the formations enter the passage 36 through the opening 38. The mixture of fluids passes then in succession through viscosity, density, water and flowmeter devices 50, 52, 54 which have uniform cross-sections as the cross-section of the passage 36.

For purposes of explanation, the casing may have a cross-section of about 250 square centimeters and the output of the well may be 3.6 cubic meters per hour. Thus, the ratio between the areas of the casing 22 (250 sq. cm.) and the measuring tube 36 (2 sq. cm.) is equal to 125. Since the total output of the well is equal to one litre per second, the average speed with which the fluids rise inside the casing above the upper producing formation 26, is equal to 4 cms. per sec. and is therefore equal to 50 cms. per sec. in the flow measuring passage 36. Thus, the actual rising speeds of the gas bubbles in the oil or of the drops of oil and bubbles of gas in the water under the action of the difference is specific weights of the three fluids, become very small with reference to the average speed of the mixture inside the measuring tube, said rising speeds being as a matter of fact at a maximum equal to about 10 cms. per sec. For this reason, the information provided by the density device, the viscosity device and the detector of water percentage are consistent with the information supplied by the flowmeter since they define actually the mixture of flowing fluids because the components of said mixture have volumes passing transiently through the devices which are very substantially proportional to the partial outputs of said fluids.

The lower limit of this average speed of flow of the fluids in the measuring passage is, according to the invention, equal to 60 cms. per sec. Experiments made by applicant have shown as a matter of fact, that in this case, the errors in the true values of specific weight and water percentages, were at a maximum equal to 10% which, in certain cases, may not be prohibitive.

On the other hand and always in accordance with an experimental definition provided by applicant, the upper limit of the average speed of flow of the fluids in the measuring tube is substantially equal to 1200 cms. per sec. Said upper limit is required by the minimum length which the measuring tube should have (150 cm. in the case of the example given). As a matter of fact, in the case of very large throughputs, the losses of head in the measuring tube are such that the differential pressure exerted to either side of the packer 34 provides a gradual rise of the instrument in the well under the action of an upwardly directed thrust which is larger than the apparent weight of the instrument immersed in the fluids contained in the well. In order to execute under good conditions the measurement at a given level, it is necessary for the instrument to remain at said level and therefore for the area of the passageway through the measuring tube to be selected with a sufficiently large size.

According to the indications given by the flowmeter, it is therefore possible at the different measuring levels, to estimate immediately whether the informations provided by the measuring devices correspond actually to the fluids flowing through them. However by selecting the measuring tube in accordance with the total throughput of the well (which is generally known before a series of measurements is decided) for a given well, there are found at the different levels speeds of flow which are comprised within a range which is allowable for operation of the instrument.

The short distance separating the ring 42 from the opening 38 reduces considerably the phenomena of separation in accordance with specific weights, as may occur in such a space when the plug 34 is inflated. For this reason, if gas exists in the mixture in substantial amounts, the phenomenon of a pulsatory output of gas in the measuring tube ocurs only with a very low amplitude and at a comparatively high frequency, which disturbs finally only to a very small extent the operation of the measuring devices 50, 52 and 54.

Thus, the electronic cartridge 58 sends into the surface panel 18 such information as supplied by the various devices in any suitable form of transmission, such information disclosing the average values of specific weight, viscosity and output of a same mixture of fluids and the percentage of water contained inside the mixture (the information defining said percentage being slightly modified when gas is present). Furthermore, the knowledge of the temperature prevailing at the actual location of the measurement, allows allotting possibly to the rough results supplied by the measuring devices 50, 52, 54 and 62, suitable correcting coefficients, as disclosed in the above-mentioned patent applications.

The person executing the tests and checking the variations in pressure measured by the pressure gauge 62 sees the transient conditions following expansion of the packer 34. He may therefore, ascertain through the difference in pressure between the beginning and the end of the transient conditions, the losses of head in the measuring tube and estimate if these are not prohibitive for a proper measurement. On the other hand, by comparing the information fed by the measuring devices throughout the duration of the transient conditions, the operator may obtain immediately various data. Thus, for instance, if the density device and the detector of water percentage show at the beginning of the measurement that the only fluid contained in the flow measuring tube, is constituted by water and that, after a certain time, there flows only through said tube a mixture of oil and gas, the operator will deduce immediately therefrom, that stagnant water covers the producing layers and that the latter produce oil and gas.

Knowing the pressure and temperature at the location where the measurement is made, it is possible to obtain through well-known charts the values of the density of the gases and of the viscosity of the oils at the depth at which the measurement has been made.

On the other hand, it is a a well-known fact that substantial modifications in the specific weight are recorded in the presence of gas and, obviously, the same is the case for the percentage of water in the presence of water. As to the information relating to the viscosity, this can be used only cautiously since it is a known fact that emulsions of oil and water have viscosities which rise up to values ten times larger than that of their components. For this reason, the viscosity information is used only if it has serious chances of relating to a simple mixture of fluids and not to an emulsion.

One selects then through their absolute value (water) or else through comparison with constant data defining each element (gas or oil) at the depth of measurement, the two informations which define, in a more characteristic manner, said elements which, associated with said constant values, supply three equations with three unknown quantities, the solving of which by simultaneous equations, leads to obtaining the proportions of water, gas and oil in the mixture at each of the levels. The information neglected in said first approach to the solution allows of course improving subsequently the accuracy of the results of calculation.

Said calculation may obviously be executed by hand or, better still, by means of a machine, provided the information is suitably recorded for instance on multitrack magnetic strips.

Knowing the proportions of water, gas and oil in the mixture of fluids flowing at substantially equal speeds in the measuring tube, it is possible consequently to allot to the information provided by the flowmeters of the propeller type 54 suitable correcting coefficients since the characteristic curves of the response of such apparatus are obviously functions of the specific weight of the flowing fluids. Charts supply, as a function of the relative proportions of flowing fluids at the level of measurement, the correcting coefficients the use of which allows obtaining the total actual output. If it is then desired to still further increase the accuracy of the results, one corrects the information provided by the measuring devices as a function of said actual total output. As a matter of fact, whatever may be the average speed in the measuring tube or passage, the relative speeds of the three fluids differ obviously by predetermined amounts by reason of their specific weights. Charts obtained, starting from systematic experiments made by applicant, allow correcting starting from the total output, the information fed by the densimeter and by the detector of water percentages. Further equations are obtained which supply further relative proportions of water, gas and oil. Through a repetition of said procedure, it is possible to still further improve the results. One obtains then through a mere multiplication, the partial outputs of water, gas and oil.

If, in a first and a second period, there is obtained a first and a second series of measurements by inserting the packer 34 underneath the perforations 24 and 25 and then above said perforations, it is possible, by subtracting the partial outputs calculated, starting from said measurements, to ascertain exactly the production of the layer 26.

The invention is not limited to the embodiment described hereinabove and it may in contradistinction form the object of modifications.

In the first place, the size of the instrument, the diameter and the output of the well have been given only by way of exemplification. Furthermore, instead of executing a measurement of three magnitudes defining the nature of the fluids, it is possible to measure only two magnitudes. Generally, the measurement of percentages of water is retained, since water is always produced by the well in more or less considerable amounts. One retains also the information as to specific weight rather than that relating to viscosity, not only by reason of the difficulties which may occur for the interpretation of the latter magnitude, but also, as disclosed in the U.S. patent application Ser. No. 230,224, now U.S. Patent No. 3,225,588, because specific weight appears as a modification in frequency whereas viscosity is ascertained by a modification in amplitude which it is essential in practice to transform into variations in frequency, so as to feed it under suitable conditions into the panel 18, which would, of course, require further electronic circuits.

As to the measuring devices used, they may obviously be different from those proposed for the execution of measurements of specific weight, viscosity or percentage of water, provided they may be positioned directly above each other inside a same measuring tube and show passageways having cross-sections of the same order of magnitude as that of said measuring tube.

It is even possible to measure instead of the above-mentioned magnitudes, other magnitudes which are also characteristic for one of the fluids produced by the oil well. Thus, it is possible to measure either the acoustic impedance or else the index of refraction of the mixture, both being more particularly characteristic of the presence of gas, or else the average resistivity of the mixture which is more particularly characteristic of the presence of salt water.

If it is desired only to ascertain the nature of the fluids existing at each level of a well, it is possible to use an instrument which derives from that described hereinabove but in which are eliminated, on the one hand, the inflatable packer and its hydraulic cartridge and, on the other hand, the flowmeter and the associated electronic circuits. In this case, the cross-section of the passageway in the measuring tube is no longer critical and may be chosen as large as possible.

It is also possible to replace the outer inflatable packer by any other type of collapsible outer packer.

It is also possible to equip the instrument with different auxiliaries of known types.

Thus, it is possible to resort to casing collar magnetic means detecting the connecting collars between the sections of the lining, which detector allows ascertaining, with a high accuracy, the level at which the measurement is being executed.

Thus, it is also possible to associate with the tool, a centering member provided with elastic arms to position the instrument inside the borehole, even in the case of a sloping borehole.

It is also possible, on the other hand, to resort to two outer collapsible packers if it is desired to measure directly the partial outputs of a predetermined layer, said plugs being located to either side of the perforations.

In this case, one resorts to an auxiliary tube for the passage of the fluids to allow said fluids produced by the lower layers, to pass through the space separating the two plugs in a manner such that the differential pressures exerted on the lower plug may be sufficiently weak so that the instrument cannot rise.

It is obviously possible to extend to wells of all types the methods provided by the invention for defining the nature and amount of fluids produced (fresh water wells, and water injecting wells supplying superheated steam for instance).

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. A method of defining the relationship between mixed fluids including gas, oil and water as such fluids are naturally produced from earth formations into a well bore, comprising the steps of: lowering on a wireline a fluid characteristic measuring apparatus into a well bore to a given level; expanding a packer on the apparatus to pack off the well bore to force all naturally produced fluid flow through a measuring tube in the apparatus; detecting in the measuring tube at such level at least the percent of water in the mixture and the density of the mixture flowing through the measuring tube; while detecting the percent of water and the density, also measuring the natural rate of flow of the mixed produced fluids through the measuring tube; and providing simultaneous indications to the earth's surface of percent of water in the mixture, the density of the mixture, and the natural rate of flow of the mixture to permit a determination of the specific relationship of each component in the naturally produced mixture as it is produced.

References Cited

UNITED STATES PATENTS

| | | | |
|---|---|---|---|
| 2,172,625 | 9/1939 | Schlumberger | 324—11 |
| 3,103,812 | 9/1963 | Bourne et al. | 73—155 |
| 3,248,938 | 5/1966 | Hill et al. | 73—155 |

RICHARD C. QUEISSER, *Primary Examiner.*

JAMES J. GILL, *Examiner.*

J. W. MYRACLE, *Assistant Examiner.*